US007894367B2

(12) United States Patent
Lin et al.

(10) Patent No.: US 7,894,367 B2
(45) Date of Patent: Feb. 22, 2011

(54) METHODS AND SYSTEMS FOR BANDWIDTH PROTECTION

(75) Inventors: Chung-Wei Lin, Changhua (TW); Xin-Ying Lin, Gueiren Township (TW); Chung-Ming Huang, Miaoli (TW)

(73) Assignee: Industrial Technology Research Institute, Hsinchu (TW)

( * ) Notice: Subject to any disclaimer, the term of this patent is extended or adjusted under 35 U.S.C. 154(b) by 141 days.

(21) Appl. No.: 12/326,226

(22) Filed: Dec. 2, 2008

(65) Prior Publication Data
US 2009/0175191 A1 Jul. 9, 2009

Related U.S. Application Data

(60) Provisional application No. 61/017,898, filed on Dec. 31, 2007.

(51) Int. Cl.
*H04L 12/26* (2006.01)
(52) U.S. Cl. ........................................... 370/252
(58) Field of Classification Search ........................ None
See application file for complete search history.

(56) References Cited

U.S. PATENT DOCUMENTS

| | | | | |
|---|---|---|---|---|
| 2003/0046383 A1* | 3/2003 | Lee et al. | ...................... | 709/224 |
| 2006/0156201 A1* | 7/2006 | Zhang et al. | ................. | 714/776 |
| 2009/0122697 A1* | 5/2009 | Madhyasha et al. | ......... | 370/229 |
| 2009/0284650 A1* | 11/2009 | Yu et al. | ................... | 348/390.1 |
| 2009/0285211 A1* | 11/2009 | Muramoto et al. | ........... | 370/390 |

* cited by examiner

*Primary Examiner*—Min Jung
(74) *Attorney, Agent, or Firm*—Finnegan, Henderson, Farabow, Garrett & Dunner, LLP

(57) ABSTRACT

Presented are methods and systems for providing bandwidth estimation and correction in a communications network. Bandwidth estimation and correction can include calculating a round trip time (RTT) value and a packet loss rate (PLR) value for each packet of a set of packets transmitted at different points in time from a server to a client terminal over the communications network; determining a bandwidth estimate based on the RTT and PLR values for the set of packets transmitted; determining a bandwidth measurement based on the RTT and PLR values for the set of packets; and determining a corrected bandwidth estimate based on the bandwidth estimate and the bandwidth measurement.

19 Claims, 3 Drawing Sheets

METHODS AND SYSTEMS FOR BANDWIDTH PROTECTION

RELATED APPLICATIONS

This application claims the benefit of U.S. Provisional Application No. 61/017,898, filed Dec. 31, 2007, the contents of which is incorporated in its entirety herein by reference.

TECHNICAL FIELD

This invention relates to bandwidth prediction and, more specifically, to bandwidth estimation and prediction in a multi-media communications environment.

DISCUSSION OF RELATED ART

Current technology allows multi-media content to be communicated through various media such as airwaves, cable, and optic fiber and in various communication environments such as wired networks, third-generation (3G) networks, Wi-Fi networks, and the Internet. Various models have been established in order to estimate network parameters concerning performance and quality. Such network parameters may include, for example, available bandwidth in a network path, transmission latency, and data transmission rates. However, it may be difficult to determine these parameters because communication environments may be complicated and rapidly changing due to the time-varying nature of packet loss rate, network congestion, and client mobility.

One such model is used to estimate available bandwidth for a communications network. In this model, bandwidth may be determined by using a detection module at a client terminal that sends a request message (packet) to a server at a first point in time, $T_1$, and receives a response message (packet) from the server at a second point in time, $T_2$. Bandwidth is then calculated by the following equation (1):

$$BW=RP_{size}/(T_2-T_1), \quad (1)$$

where BW is the bandwidth, and $RP_{size}$ is the size of the response packet. However, network conditions, such as network congestion, may not be determined by the packet transmission time alone. Other variables, for example, packet loss rate and actual packet size received by a client, may need to be taken into account when calculating bandwidth. For example, in a relatively unstable wireless network, a Round-Trip-Time (RTT) of a packet may be subject to dramatic variation, which may result in an incorrect bandwidth calculation due to an extraordinary RTT, such as a burst RTT. Therefore, the model expressed in equation (1) may result in an erroneous estimate because it lacks a correction mechanism.

Another model uses "probing packets" to estimate unused capacity or available bandwidth. In this model, a one-way-delay (OWD) is calculated for each probing packet. An OWD trend (OWDT) is then calculated and used to determine whether the transmission rate of a probing packet is greater than the actual available bandwidth. The OWD and the OWDT can be determined by the following equations (2A) and (2B):

$$OWD=T_a-T_s+\text{ClockOffset} \quad (2A)$$

$$OWDT=OWD_i-OWD_{i-1}, \quad (2B)$$

where $T_a$ represents the time at which the probing packet arrives at a receiver, $T_s$ represents the time at which a sender sends the probing packet, and ClockOffset represents the system clock offset between the sender and the receiver.

Because the OWDT is the difference between the OWD values of two consecutive packets, e.g., $OWD_i$ of a packet i and $OWD_{i-1}$ of a packet i−1, as indicated in equation (2B), the system clock offset may be eliminated after subtracting the OWD values. As a result, synchronization between the sender and the receiver may not be a matter of concern in this model. As the OWDT increases, the upper bound of the bandwidth estimate (measured as bytes per second (bps)) may decrease. On the other hand, as the OWDT decreases, the upper bound of the bandwidth estimate may increase. When the distance between the upper bound and the lower bound of the bandwidth estimate is smaller than a determined value, then, by using an approximation approach, convergence of the bandwidth estimate may be obtained. For example, the bandwidth estimate may be calculated as the average of the upper bound and the lower bound. However, the available bandwidth may be estimated incorrectly if the OWDT is not sufficient for the bandwidth estimate to reach convergence using an approximation approach. For example, the time measured may not be long enough or the number of packets detected may be insufficient.

Another model uses a filter to estimate available bandwidth. In this model, a Kalman filter may be employed to predict latency and available bandwidth in accordance with the RTT of probing packets using the following equations (3A) and (3B):

$$X_k^e=[L,1/BW]^T \quad (3A)$$

$$X_k^e=\phi X_{k-1}^e+K[z_k-HX_k^e], \quad (3B)$$

where $X_k^e$ is an estimate at a point in time k, L is latency, BW is bandwidth, T is a transpose operator for the matrix, $\phi$ is a state transition matrix [1,1], $z_k$ is an RTT measurement, H is a measurement matrix, and K is a function of an estimate error covariance ("Q") and a measurement error covariance ("R"). Q and R may be constants.

The Kalman filter accumulates a history of information, such as packet information or congestion information, and may generally reference the history when estimating bandwidth. However, when a session handoff occurs, network characteristics may change. The reference materials in the history, however, are not updated with the current network characteristics and may therefore cause erroneous estimates.

There is, therefore, a need to provide an improved way to estimate bandwidth in a multi-media communications environment

SUMMARY

Consistent with embodiments of the present invention, systems and methods for bandwidth prediction are presented. A system for bandwidth estimation and correction in a communications network can include a network analysis module configured to calculate a round trip time (RTT) and a packet loss rate (PLR) for each packet of a set of packets transmitted at different times from a server to a client terminal over the communications network; a bandwidth estimation module configured to determine a bandwidth estimate based on the RTT and PLR values for the set of packets; a bandwidth measurement module configured to determine a bandwidth measurement based on the values of RTT and PLR for the set of packets; an estimation-error correction module configured to determine a corrected bandwidth estimate based on the bandwidth estimate and the bandwidth measurement; and a rate-decision module configured to determine a transmission rate based on the bandwidth estimate and an available buffer size of the client terminal, wherein the transmission rate is used by the server to adjust packet transmissions.

A method for providing bandwidth estimation and correction in a communications network consistent with embodiments of the present invention includes calculating a round trip time (RTT) value and a packet loss rate (PLR) value for each packet of a set of packets transmitted at different points in time from a server to a client terminal over the communications network; determining an bandwidth estimate based on the RTT and PLR values for the set of packets; determining a bandwidth measurement based on the RTT and PLR values for the set of packets; determining a corrected bandwidth estimate based on the bandwidth estimate and the bandwidth measurement; and determining a transmission rate based on the bandwidth estimate and an available buffer size of the client terminal, wherein the transmission rate is used by the server to adjust packet transmissions.

These and other embodiments of the present invention are further described below with reference to the following figures.

DETAILED DESCRIPTION

Figure 1:
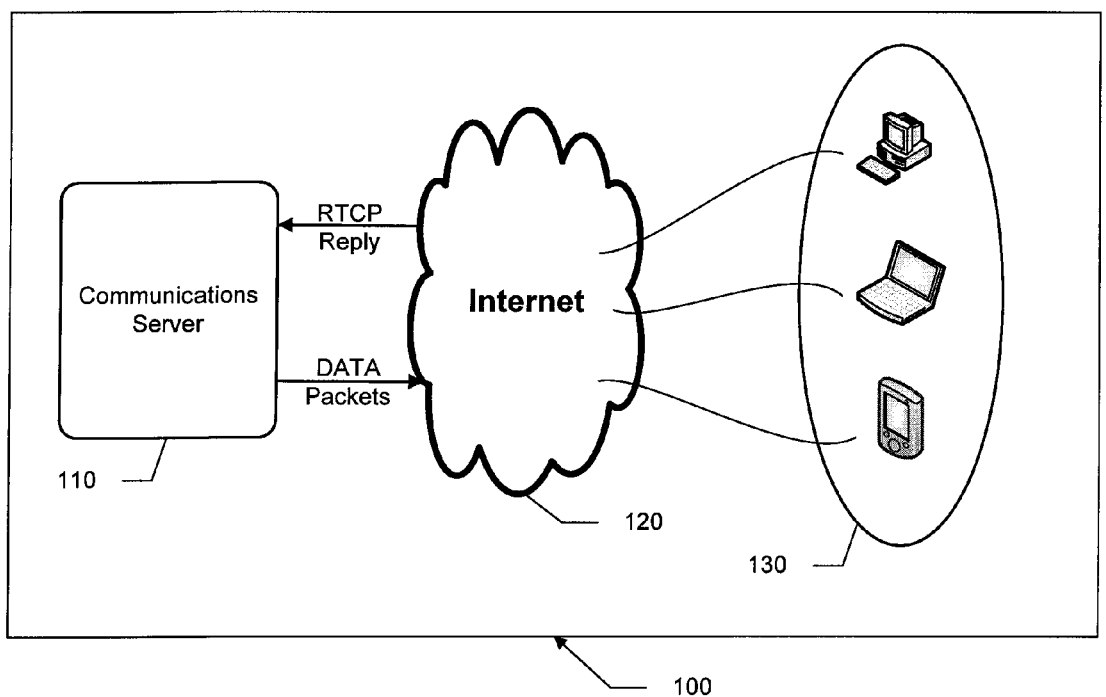
FIG. 1 is a block diagram illustrating an exemplary communications system for bandwidth estimation.

This description is explicative of certain embodiments of the invention and should not considered to be limiting. The system components and methods are represented herein by appropriate conventional symbols in the drawings, showing only those specific details that are pertinent to understanding the embodiments of the present invention, so as not to obscure the disclosure with details that will be readily apparent to those of ordinary skill in the art having the benefit of the description herein.

FIG. 1 illustrates an exemplary representation of a networked communications system 100 for bandwidth estimation in which various embodiments of the invention may be practiced. It should be understood that various functional units depicted can, in practice, individually or in any combinations, be implemented in hardware, in software executed on one or more hardware components (such as on one or more processors, in one or more application specific integrated circuits, or in other such components), or in any combination thereof.

Communications system 100 may include a communications server 110 and a client terminal 130, wherein server 110 and client terminal 130 communicate with each other over a communications network 120. Client terminal 130 may, for example, include a personal computer (PC), a notebook computer, a personal digital assistant (PDA), or any electronic device capable of supporting network communication.

Communications network 120 may include: a wired network, a wireless area network (WAN), a third-generation (3G) network, a WiMax network, or other suitable networks. Server 110 may be configured to transmit data packets to client terminal 130 over communications network 120 and thereafter receive a message, such as a real-time transmission control protocol (RTCP) reply, from client terminal 130.

Figure 2:
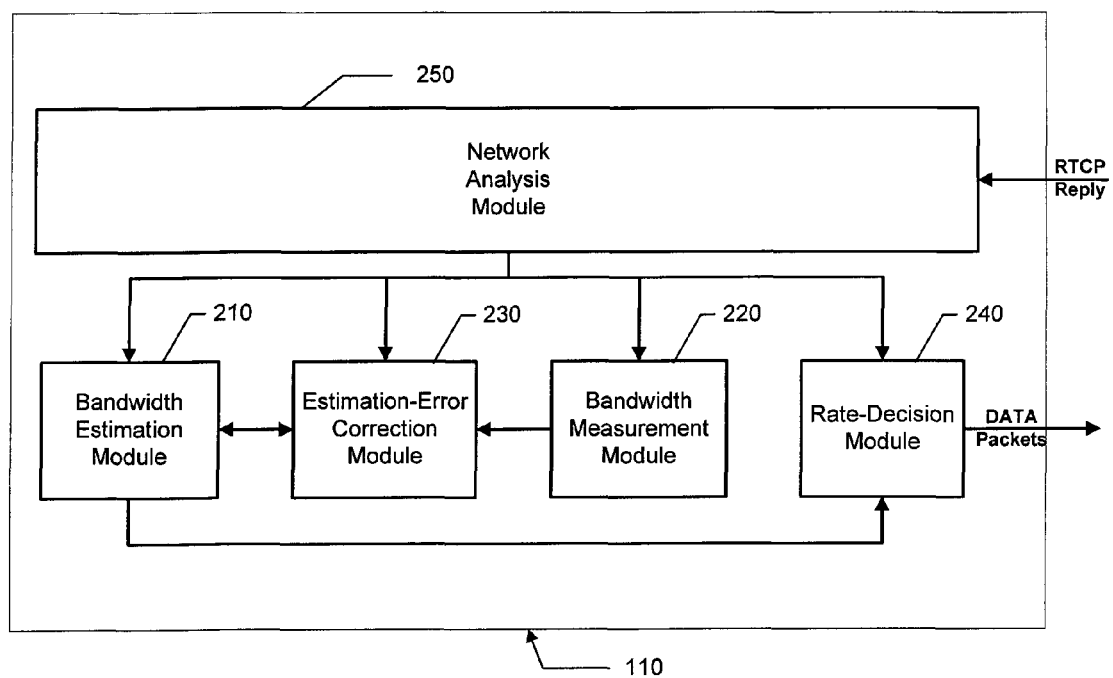
FIG. 2 is a block diagram depicting components of a communications system server consistent with an embodiment of the present invention.

FIG. 2 is a block diagram depicting exemplary functional modules of server 110. Server 110 may include: a bandwidth estimation module 210, a bandwidth measurement module 220, an estimation-error correction module 230, a rate-decision module 240, and a network analysis module 250. Modules of server 110 may be implemented in hardware or software. Hardware implementations may be more advantageous in view of operational speed, while software implementations may be more cost effective in view of design complexities. In one embodiment, modules of server 110 may be incorporated within an integrated circuit (IC) or chip, which in turn may be included in a base station or a relay station capable of providing access to client terminal 130.

Network-analysis module 250 may be configured to transmit data packets to client terminal 130 and receive reply messages, such as RTCP reply messages, using communications network 120. An exemplary RTCP reply message may be a report message that contains information concerning client terminal 130 measurements, such as when data packets arrived, the number of packets received, and the buffer size used. In other words, the RTCP reply message may contain information relating to the channel condition of a given channel in communications network 120, over which a data packet is sent from server 110 to client terminal 130.

As shown in FIG. 2, network analysis module 250 is coupled with bandwidth estimation module 210, bandwidth measurement module 220, estimation-error correction module 230, and rate-decision module 240. Network analysis module 250 may add a timestamp and sequence numbering to the header of each data packet transmitted by server 110 to client terminal 130. For each RTCP reply message received by server 110 from client terminal 130, network analysis module 250 may calculate the RTT and the packet loss rate (PLR) for the corresponding data packet transmitted by server 110 to client terminal 130 by using the following equations (4) and (5):

$$RTT = T_{rc} - T_{tx} \quad (4)$$

$$PLR = 1 - (N_{rc}/N_{tx}), \quad (5)$$

where $T_{rc}$ is the time at which a given reply packet was received by client terminal 130, $T_{tx}$ is the time at which the corresponding data packet was transmitted by server 110, $N_{rc}$ is the number of data packets (in bytes) received at client terminal 130 per unit of time, and $N_{tx}$ is the number of the data packets (in bytes) transmitted by server 110 per unit of time.

The following example, using equations 4 and 5, illustrates sample RTT and PLR calculations. Given an initial transmission time of 00:00:00, May 16, 2007, wherein server 110 began transmitting a data packet to client terminal 130, and a receiving time of 00:00:01, May 16, 2007, wherein the response message from client terminal 130 was received by server 110, RTT is calculated as:

$$RTT = (2007.5.16, 00:00:01) - (2007.5.16, 00:00:00) = 1 \text{ sec.}$$

Further, given that a set of packets transmitted in sequence by server 110 is numbered 1, 2, 3, 4, and 5, and the packets received by client terminal 130 are numbered 1, 3, 4, and 5, the packet loss rate (PLR) is calculated as:

$$PLR = 1 - (4/5) = 0.2.$$

As shown in FIG. 2, bandwidth estimation module 210 may be coupled with network analysis module 250. Bandwidth estimation module 210 may be configured to receive from network analysis module 250 RTT information for each of the received data packets and estimate a congestion status of communications network 120. Bandwidth estimation module 210 may also be coupled with estimation-error correction module 230 and rate-decision module 240. Bandwidth estimates derived from bandwidth estimation module 210 may be further refined by estimation-error correction module 230 as described below. Rate-decision module 240 may also use bandwidth estimates derived from bandwidth estimation module 210 in order to determine transmission rates as described below.

In one embodiment, bandwidth estimation module 210 may determine a bandwidth estimate using the following equation (6):

$$BW(t) = BW(t-1) \times \left[\left(\sum_{t-1}^{t-N-2} RTT\right) / (N+1)\right] / \left[\left(\sum_{t-1}^{t-N-1} RTT\right) / N\right], \quad (6)$$

where BW(t) equals the bandwidth estimate (expressed as bps) at a point in time t, BW(t−1) is an a posteriori bandwidth estimate at a point in time t−1, and N is the size of a sliding time-window.

The size of the sliding time-window N may be adjusted by server 110 and, for example, could be set to approximately 30 seconds. However, N may be greater than 30 seconds, for instance, when there are handoffs exceeding a predetermined frequency or when there is network congestion exceeding a predefined value. An initial bandwidth estimate at a time t(0) for communications network 120 may depend on the type of network. For example, the initial bandwidth estimate for a 3G network, a LAN, and a wireless network may be approximately 384 Kbps, 3 Mbps and 1 Mbps, respectively. In equation (6), the a posteriori bandwidth estimate may refer to a bandwidth estimate made at a point in time (t−1) immediately previous to the time that the current bandwidth estimate is being made (t=0). The bandwidth estimate made at time (t−1) is the most up to date bandwidth estimate and may represent the network characteristics. However, a bandwidth estimate made at a prior point in time (t−2) in relation to the current time (t=0) may instead be used as the a posteriori bandwidth term if the channel condition in communications network 120 is stable. In that case, equation (6) may be re-written as equation (6A):

$$BW(t) = BW(t-2) \times \left[\left(\sum_{t-2}^{t-N-2} RTT\right) / (N+1)\right] / \left[\left(\sum_{t-2}^{t-N-1} RTT\right) / N\right]. \quad (6A)$$

Skilled persons in the art will now understand that equation (6) may be written in other forms if bandwidth estimates and RTT values obtained in prior estimates are useful in the current bandwidth estimation.

The bandwidth estimate, as seen from equation (6), may be a function of the size of the sliding time-window N, and thus may result in an estimate error covariance Q. The calculations involving the RTT averages in equation (6) may be represented by a transition matrix φ, which may be regarded as a state transition of available bandwidth, i.e., a trend of available bandwidth, as equation (6B):

$$\phi = \left[\left(\sum_{t-2}^{t-N-2} RTT\right) / (N+1)\right] / \left[\left(\sum_{t-2}^{t-N-1} RTT\right) / N\right]. \quad (6B)$$

Since the state transition may be calculated based on averaging RTT values, the result of the state transition may be relatively smooth. For example, by using averaged RTT values, state transition divergence may be prevented due to network conditions, such as a burst RTT.

An estimate error covariance Q' may be used to calculate an a priori-error covariance p⁻(t), which may refer to an error covariance obtained prior to the current bandwidth estimate at time t. The a priori-error covariance may be expressed using the following equation (7):

$$p^-(t) = \phi'^2 p^+(t-1) + Q', \quad (7)$$

where p⁺(t−1) is an a posteriori error covariance, which refers to an error covariance obtained a posteriori to the bandwidth estimate made at a time (t−1). In one embodiment, bandwidth estimation module 210 may include, but is not limited to, a Kalman filter to calculate the variable p⁻(t).

As shown in FIG. 2, bandwidth measurement module 220 may be coupled with network analysis module 250 and estimation-error correction module 230. Bandwidth measurement module 220 may be configured to receive RTT and PLR information for each of the data packets from network analysis module 250. Bandwidth measurement module 220 can be configured to measure available bandwidth using the following equation (8):

$$BW = (RP_{size}/RTT) \times (1-PLR), \quad (8)$$

where $RP_{size}$ is the size of the data packets in bytes.

Packet loss may result from network conditions, such as congestion or poor connection quality in a wireless network, which may lead to a measurement error covariance R'. As shown in FIG. 2, estimation-error correction module 230 may be coupled with network analysis module 250, bandwidth estimation module 210, and bandwidth measurement module 220. Estimation-error correction module 230 can be configured to receive bandwidth information from bandwidth estimation module 210 and bandwidth measurement module 220, and then further determine corrected bandwidth estimates. A correction gain, such as a Kalman gain, may be used to correct bandwidth estimates. The Kalman gain can be determined by using the following equation (9):

$$K = p^-(t)/(p^-(t) + R'), \quad (9)$$

where R' is a measurement error covariance. The estimate error covariance Q', in equation (7), the measurement error covariance R', equation (9), are respectively defined in equations (10) and (11):

$$Q' = |(BW_e - N_{rc})|/N_{rc}, \quad 0 \leq Q' \leq 1 \quad (10)$$

$$R' = |(BW_m - N_{rc})|/N_{rc}, \quad 0 \leq R' \leq 1, \quad (11)$$

where $BW_e$ is a bandwidth estimate in bps, $N_{rc}$ is the number of received data packets in bps, and $BW_m$ is a bandwidth measurement in bps. A corrected bandwidth estimate $BW_c$ may then be determined by equation (12):

$$BW_c = BW_e + (K \times BW_m - BW_e) \quad (12)$$

Thus, the expression "(K×$BW_m$−$BW_e$)" in equation (12) represents the amount of correction for the bandwidth estimate.

Generally, R', being inversely proportional to K, may be smaller than Q'. Subsequently, an a posteriori error covariance $p^+(t)$ may be determined by equation (13):

$$p^+(t)=p^-(t)[1-K] \tag{13}$$

When a handoff of client terminal 130 occurs, network characteristics may change significantly. As a result, the RTT provided by network analysis module 250 may become unreliable. In one embodiment, when a handoff occurs, a first predetermined value, such as '1', may be assigned to the estimate error covariance Q' and a second predetermined value, such as '0', may be assigned to the measurement error covariance R'. Also, if an RTCP response packet is lost, network analysis module 250 may fail to receive network characteristic information for a given period of time. In such a case, data needed for determining a bandwidth estimate may not be available. In one embodiment, consistent with the present invention, a third predetermined value, such as '0.8', may be assigned to the estimate error covariance Q' and a fourth predetermined value, such as '0.2', may be assigned to the measurement error covariance R' when the response packet is missing. In addition, when the bandwidth estimate ($BW_e$) equals the number of received packets ($N_{rc}$) in equation (10) and the bandwidth measurement ($BW_m$) equals the number of received packets ($N_{rc}$) in equation (11), then the variables Q, R', and $p^-(t)$ may be equal to zero, thus rendering the variable K in equation (12) insignificant. In such a case, as can be derived from equation (12), the corrected bandwidth estimate (BWc) equals the bandwidth estimate ($BW_e$).

Rate-decision module 240 may be configured to determine a transmission rate (TR), expressed in bps. As shown in FIG. 2, rate-decision module 240 is coupled to network analysis module 250 and bandwidth estimation module 210. Rate-decision module 240 may be configured to receive bandwidth information from bandwidth estimation module 210 along with network information from network analysis module 250. Rate-decision module 240 may determine the transmission rate based on the bandwidth estimate from equation (6) and the available buffer size for client terminal 130. In one embodiment, the transmission rate (TR) may be determined by the following equation (14):

$$TR=\min(BW_e, B_{size}), \tag{14}$$

where $B_{size}$ is the buffer size for client terminal 130 determined by the following equation (14A):

$$B_{size}=\max([C \times B_{max}-B_{cur}],0), \tag{14A}$$

where C is a constant, $B_{max}$ is the maximum buffer size, and $B_{cur}$ is the buffer size currently in use. The transmission rate (TR) may be used by server 110 to adjust packet transmissions.

The maximum buffer size may depend on the equipment at client terminal 130. For example, a desktop computer may have more available memory space to allocate as a buffer than a PDA. In one embodiment, the constant C may have a default value of approximately '0.8.'

Figure 3:
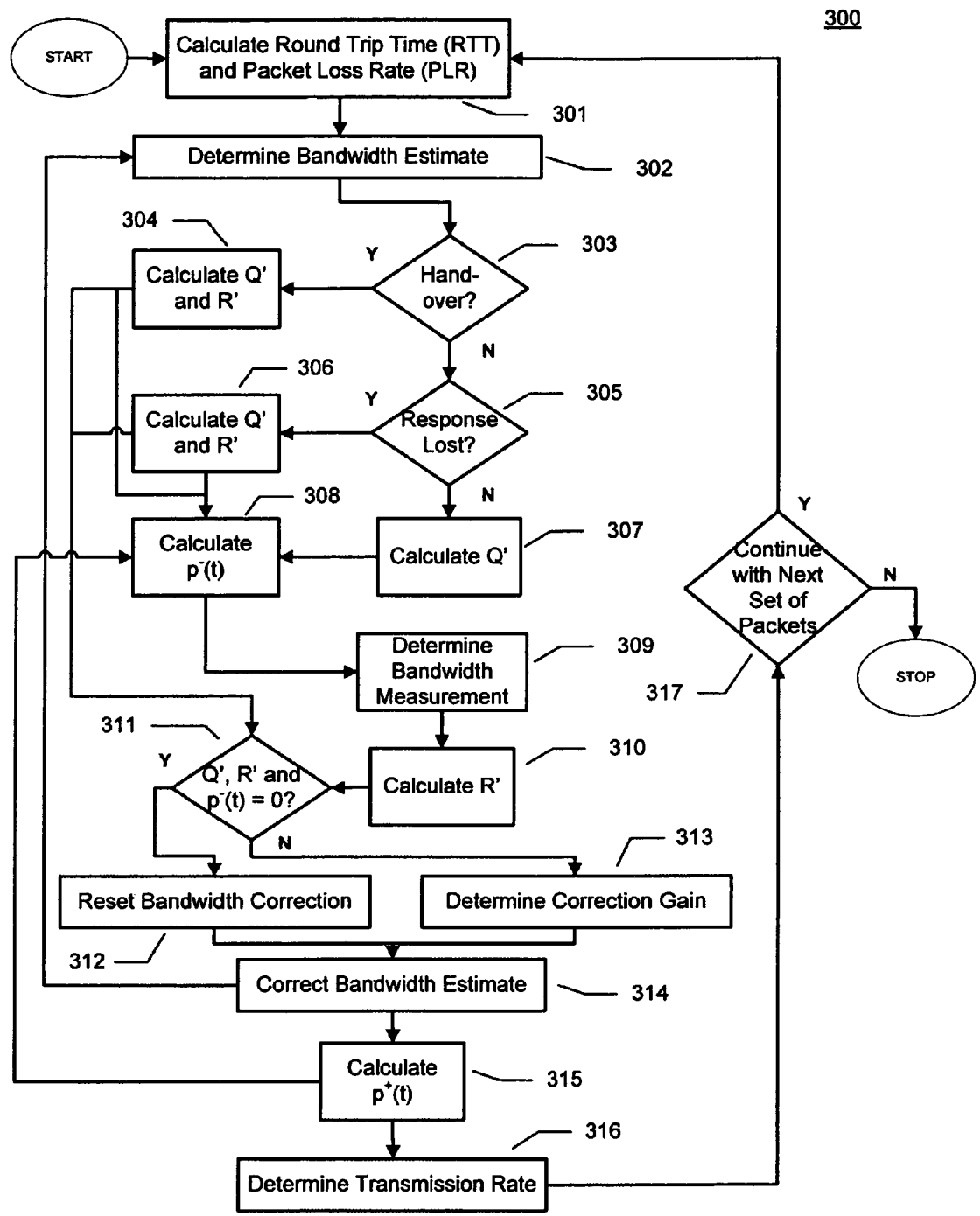
FIG. 3 is a flow chart depicting a method for determining bandwidth consistent with an embodiment of the present invention.

FIG. 3 is a flowchart 300 depicting a method for estimating bandwidth consistent with some embodiments of the present invention. Referring to FIG. 3, the round trip time (RTT) and the packet loss rate (PLR) are calculated for each packet transmitted from server 110 across communications network 120 using information from reply messages received from client terminal 130 in response to the packets transmitted by server 110 (301). Reply messages, such as RTCP replies, may be received from client terminal 130 by server 110 in response to each packet transmitted. RTT may be calculated using equation (4) and PLR may be calculated using equation (5).

A bandwidth estimate may be determined using equation (6) (302). The bandwidth estimate is based on the RTT for each packet transmitted at different time points within a sliding time-window. A check may be made to determine whether a handoff or a handover occurred (303). If the check is true (303—Yes), then a first set of values for the estimate error covariance (Q') and the measurement error covariance (R') may be obtained (304). Otherwise (303—No), a check is made to determine whether a response message, such as an RTCP reply, has been lost (305). If the check is true (305—Yes), then a second set of values for Q' and R' may be calculated (306). Otherwise (305—No), Q' may be calculated using equation (10) (307).

Next, an a priori-error covariance $p^-(t)$ may be calculated using equation (7) (308). The a priori-error covariance is based on the value of the previously calculated estimate error covariance (Q'). A bandwidth measurement may be performed to provide a measure of available bandwidth using equation (8) (309). The bandwidth measurement is based on RTT and PLR values. If a value for the measurement error covariance (R') was not previously calculated, then R' is calculated (310) using equation (11) based on the bandwidth measurement (309).

Next, a check is made to determine whether the values of Q', R' and p (t) equal zero (311). If the check is true (311—Yes), then the bandwidth estimate (302) may serve as a corrected bandwidth estimate (312). That is, no bandwidth correction is needed, and the effective bandwidth correction value is reset, i.e., set to zero. Otherwise (311—No), a correction gain, such as a Kalman gain, may be calculated using equation (9) (313). The correction gain may be used to correct the bandwidth estimate (314) using equation (12). In some embodiments, the result of the correction, i.e., the corrected bandwidth estimate $BW_c$, may be provided to calculate the bandwidth estimate (302) for a subsequent packet using equation (6). The a posteriori error covariance $p^+(t)$ may be calculated using equation (13) (315). The a posteriori error covariance is based on the calculated correction gain (313) and the calculated a priori-error covariance $p^-(t)$ (308). The determined value of the a posteriori error covariance (315) may be used to calculate the priori-error covariance value for a subsequent packet (308).

A transmission rate may be determined using equation (14) (316), the transmission rate being based on the bandwidth estimate and the available buffer size at client terminal 130. Next, a check is made to determine whether bandwidth estimation and correction are to be performed for a next set of packets (317). If the check is true (317—Yes), then the above described method may be repeated for the next set of packets, and so on.

Other embodiments will be apparent to those skilled in the art from consideration of the specification and practice disclosed herein. It is intended that the specification and examples be considered as exemplary only, with a true scope and spirit of the invention being indicated by the following claims.

What is claimed is:

1. A method for bandwidth estimation and correction in a communications network coupled between a server and a client terminal, the method comprising:
  calculating, by the server, a round trip time (RTT) value and a packet loss rate (PLR) value for each packet of a set of packets transmitted at different points in time from the server to the client terminal over the communications network;

determining, by the server, a bandwidth estimate based on calculations averaging the RTT values for the set of packets over a sliding time-window;

determining, by the server, a bandwidth measurement based on the RTT and PLR values for the set of packets; and determining, by the server, a corrected bandwidth estimate based on the bandwidth estimate and the bandwidth measurement.

2. The method of claim 1, further comprising determining a transmission rate based on the bandwidth estimate and an available buffer size of the client terminal, wherein the transmission rate is used by the server to adjust packet transmissions.

3. The method of claim 2, further including repeating the method for a next set of packets.

4. The method of claim 1, wherein the sliding time-window is greater than 30 seconds when there are handoffs exceeding a predetermined frequency.

5. The method of claim 1, wherein determining the corrected bandwidth estimate comprises:

determining an estimate error covariance $Q'$ based on the bandwidth estimate;

determining an a priori-error covariance $p^-(t)$ based on $Q'$;

determining a measurement error covariance $R'$;

determining a correction gain based on $Q'$, $p^-(t)$, and $R'$; and correcting the bandwidth estimate based on the correction gain.

6. The method of claim 5, wherein if a network handoff or handover occurs, then determining the corrected bandwidth estimate further includes assigning $Q'$ a first predetermined value and assigning $R'$ a second predetermined value.

7. The method of claim 6, further including setting the first predetermined value to be greater than the second predetermined value.

8. The method of claim 5, wherein if a response packet is lost, then determining the corrected bandwidth estimate further includes assigning $Q'$ a third predetermined value and assigning $R'$ a fourth predetermined value.

9. The method of claim 8, further including setting the third predetermined value to be greater than the fourth predetermined value.

10. The method of claim 5, further including calculating $R'$ based on the bandwidth measurement.

11. The method of claim 5, wherein if $Q'$, $R'$, and $p^-(t)$ are all equal to zero, then determining the corrected bandwidth estimate includes assigning the bandwidth estimate value.

12. The method of claim 11, wherein determining the corrected bandwidth estimate further comprises:

determining a posteriori error covariance $p^+(t)$ based on the priori-error covariance $p^-(t)$ and the correction gain; and using the posteriori error covariance $p^+(t)$ to calculate a priori-error covariance $p^-(t)$ for a subsequent packet.

13. The method of claim 5, wherein determining the correction gain further includes using a Kalman gain.

14. The method of claim 1, wherein determining the corrected bandwidth estimate further includes using a correction gain.

15. The method of claim 14, wherein using the correction gain includes using a Kalman gain.

16. A server to communicate with a client terminal over a communications network, comprising:

a network analysis module configured to calculate a round trip time (RTT) and a packet loss rate (PLR) for each packet of a set of packets transmitted at different times from the server to the client terminal over the communications network;

a bandwidth estimation module coupled to the network analysis module, and configured to determine a bandwidth estimate based on calculations averaging the RTT values for the set of packets over a sliding time-window;

a bandwidth measurement module coupled to the network analysis module, and configured to determine a bandwidth measurement based on the values of RTT and PLR for the set of packets; and an estimation-error correction module coupled to the bandwidth estimation module and to the bandwidth measurement module, and configured to determine a corrected bandwidth estimate based on the bandwidth estimate and the bandwidth measurement.

17. The server of claim 16, further comprising a rate-decision module configured to determine a transmission rate based on the bandwidth estimate and an available buffer size of the client terminal, wherein the transmission rate is used by the server to adjust packet transmissions.

18. The server of claim 17, wherein the estimation-error correction module is further configured to use a correction gain.

19. The server of claim 18, wherein the correction gain is a Kalman gain.

* * * * *